Patented Oct. 23, 1928.

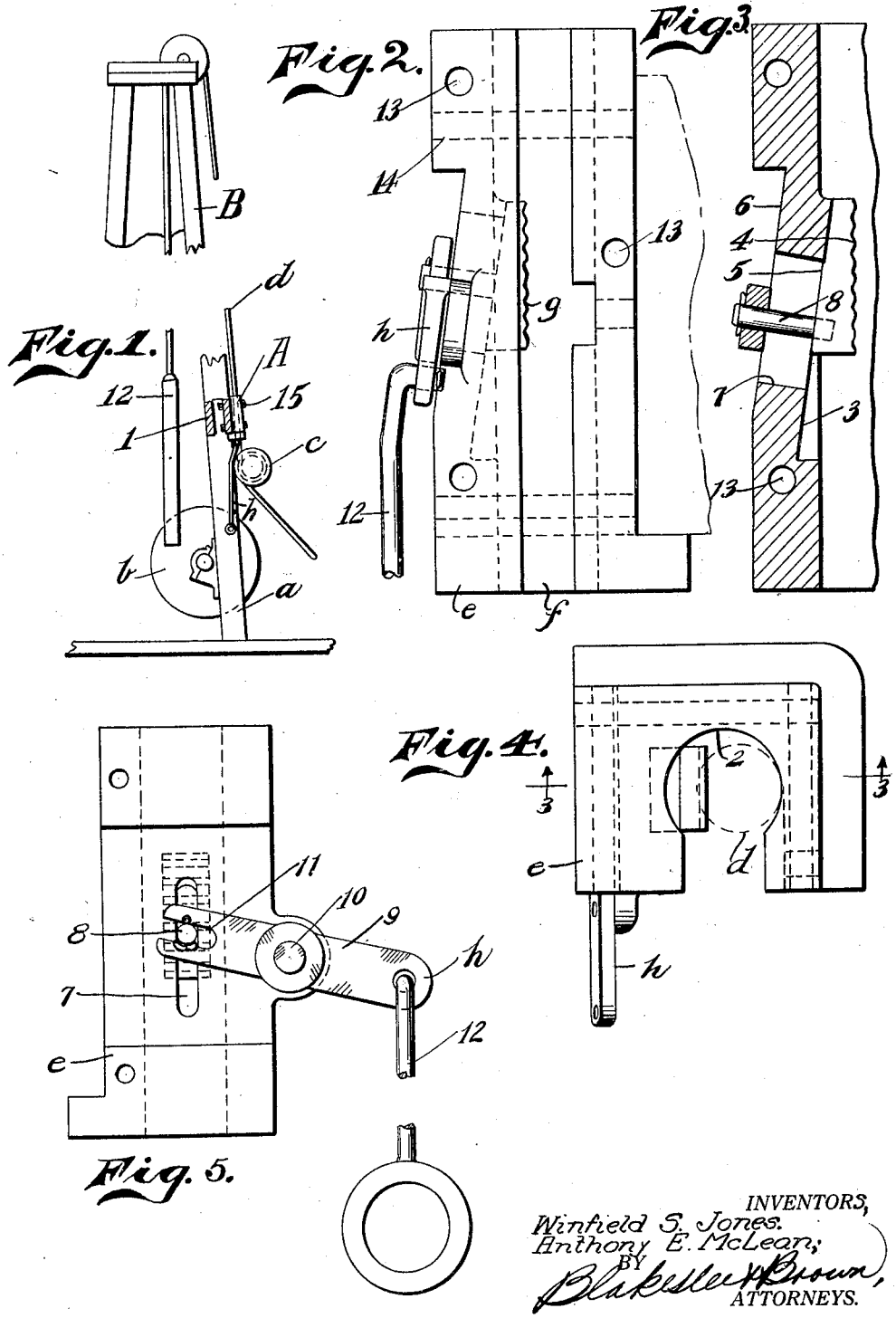

1,688,718

UNITED STATES PATENT OFFICE.

WINFIELD S. JONES AND ANTHONY E. McLEAN, OF LONG BEACH, CALIFORNIA.

CLAMP.

Application filed October 4, 1927. Serial No. 223,936.

This invention relates broadly to clamps, and particularly to a means adapted for well practices such as oil well practice, wherein certain lines may be held in selected positions. In particular it is highly desirable that a line such as is used for lifting material or pulling tongs in the tightening or untightening of pipe couplings should be controlled as to its motion and maintained in a given position at the will of the operator. At the present time it is customary to provide in rotary draw works what are known as cat heads and a line is passed around one or the other of the cat heads so that the line is moved, to in turn lift material or perform other functions. Assuming that the line is lifting material, after the material has been lifted it may be desirable to lock the line so that the material may be held in a given position. This invention readily accomplishes this result and in such a manner that the line may be readily released at the will of the operator.

The invention has for an object the provision of a device of the character stated, which is simple in construction, positive in operation and not liable to get out of order.

With the above and other objects in view, the invention consists in the novel and useful provision, formation, construction, association and relative arrangement of parts, members and features all as shown in a certain embodiment in the accompanying drawing, described generally and more particularly pointed out in the claims.

In the drawings:

Fig. 1 is a fragmentary side elevation of a draw works, incorporating the improved invention;

Fig. 2 is a vertical elevation of the device;

Fig. 3 is a cross sectional view on the line 3—3 of Fig. 4;

Fig. 4 is a top plan view of the device, and

Fig. 5 is the front elevation of the device.

Corresponding parts in all the figures are designated by the same reference characters.

Referring now with particularity to the drawing, the improved device as an entirety is designated by A, and a draw works with which said device may be incorporated by B.

In Fig. 1, I have illustrated a draw works which includes a draw work frame $a$, upon which is mounted a drum $b$, and a cat head $c$ is likewise fastened to the draw works and which cat head is driven by a main shaft, which main shaft, through the medium of a chain or the like, likewise turns the drum. These latter features are not shown for the reason that they form no part of the present invention.

Adapted to be associated in the present instance with the head boards 1 of the draw works, is the device A. The device A is adapted to control movement of a cat line $d$. This cat line is used for various purposes such as the lifting of material. The cat line is adapted to be rove about the cat head so that when the cat head is being turned by the main shaft the cat line is moved and upon slacking the cat line the device A may come into operation and lock the cat line in a given position, that is that portion of the cat line on one side of the cat head.

The device A, as has been before stated, comprises a clamp having a body or casing $e$ formed with a work receiving opening $f$, and provided with means $g$ adapted to be received within said work receiving opening for engagement with the work. The work in this instance would of course be the cat line $d$. Means $h$ is provided for operating the means $g$ to project the same either into or out of work engagement. The work receiving opening $g$ includes an outwardly facing groove, a portion of which is curved as shown at 2, and such curved portion is adapted to receive the line $d$ as indicated by dotted lines in Fig. 4. Said body is likewise provided with an inclined wall 3 acting as a cam surface for the means $g$ and this inclined wall is included within the curved confines of the work receiving opening of the body. The means $g$ comprises a slip, the work engaging face of which is sinuous or serrated in nature as shown at 4, and this slip is provided with an inclined wall 5 for engagement with the inclined wall 3 and whereby movement of the slip in one direction projects the same within the work receiving opening for engagement with the cat line or movement in a second direction releases the means $g$ from such work engagement. To this end an outer wall of the body is inclined at 6 to correspond to the inclined wall 3 and the body is slotted at 7 in the zone of the inclined walls. A pin 8 is passed through the slot 7 and is secured to the slip $g$. The means $h$ includes a lever 9 pivoted at 10 to the body $e$, one end of said lever being forked at 11 with the pin 8 received between said forks. The outer end of said lever is provided with an elongated arm 12. Thus by movement of the arm 12 it is possible to move the lever 9 so that the slip $g$ is moved upwardly or downwardly. The body $e$ is provided with bores 13 and 14 through which bores may be passed bolts 15 for securing the body to an object such as the head boards 1. It will be noted that the bores 13 lie in one plane and that the bores 14 lie in a different plane. This is done in order that the device as an entirety may be secured in different positions to some object.

In operation the device would be secured to some object such as the draw works of Fig. 1 and the cat line $d$ is received within the work receiving opening $f$. If the cat line is passed around the cat head and the car head turned, work such as indicated at 16 might be lifted to some desired position, whereupon a pull downwardly upon the arm 12 would move the lever arm 9 and move the means $g$ into engagement with the cat line. Quite obviously upward movement of the cat line would cause the means $g$ to move upwardly therewith and the serrated or sinuous portions of such means $g$ would bite into the cat line and wedge the cat line as between the means $g$ and the side wall bounding the work receiving opening.

To release the cat line it is only necessary to move the cat line downwardly slightly and then push upwardly upon the arm 12 to move the means $g$ out of engagement with said line.

It is obvious that various changes, variations and modifications may be made in departure from the particular showing of the drawing and the description as given, without departing from the true spirit of the invention.

Having thus disclosed my invention, what I claim and desire to secure by Letters Patent is:

1. A clamp comprising a body formed with a work-receiving opening and with an inclined wall facing said opening, a slip mounted for slidable movement upon said inclined wall whereby movement of the slip will project the same into or out of said work-receiving opening, said inclined wall being provided with a slot, a pin projecting from said slip through said slot, which pin travels in said slot during sliding movement of the slip upon said inclined wall, and means connected to said pin for quickly moving said slip upon said wall to grip or release the work in said work-receiving opening.

2. A clamp comprising a body formed with a work-receiving opening and with an inclined wall facing said opening, a slip mounted for slidable movement upon said inclined wall whereby movement of the slip will project the same into or out of said work-receiving opening, said inclined wall being provided with a slot, a pin projecting from said slip through said slot, which pin travels in said slot during sliding movement of the slip upon said inclined wall, a lever fulcrumed on said body, said lever being provided at one end with a slot to receive said pin, and an elongated arm connected to the other end of said lever, whereby said slip, through the medium of said lever and said pin, is quickly moved on said inclined wall for gripping or releasing the work in said work receiving opening.

3. A clamp comprising a body, means for securing said body at its rear or at one side to the frame of an oil well derrick, said body being provided with a work-receiving opening arranged to receive the cat line of an oil well rig when the body is secured to the rig frame, a slip mounted for slidable movement into and out of said work receiving opening, and means for actuating said slip for gripping or releasing said cat line in said work-receiving opening.

4. A clamp comprising a body formed with a work-receiving opening, means for securing said body on the frame of an oil well rig with said work receiving opening in position to receive the cat line of the rig, a slip slidably mounted to move into or out of said work-receiving opening, and means for actuating said slip for gripping or releasing said cat line in said work receiving opening.

In testimony whereof, we have signed our names to this specification.

WINFIELD S. JONES.
ANTHONY E. McLEAN.